May 15, 1962 D. H. MENZEL ETAL 3,034,594
METHOD OF SEISMIC EXPLORATION AND APPARATUS THEREFOR
Filed April 8, 1958 2 Sheets-Sheet 1

INVENTOR.
DONALD H. MENZEL
THOMAS GOLD
BY
Philip H. Sheridan
ATTORNEY

May 15, 1962     D. H. MENZEL ETAL     3,034,594
METHOD OF SEISMIC EXPLORATION AND APPARATUS THEREFOR
Filed April 8, 1958     2 Sheets-Sheet 2
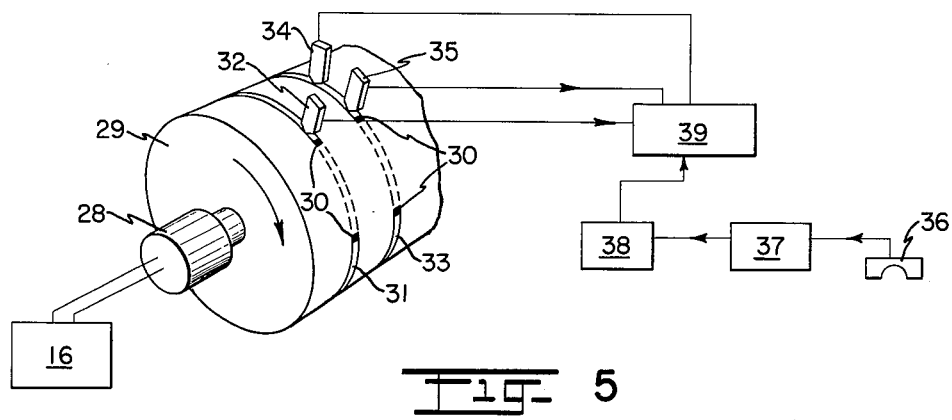
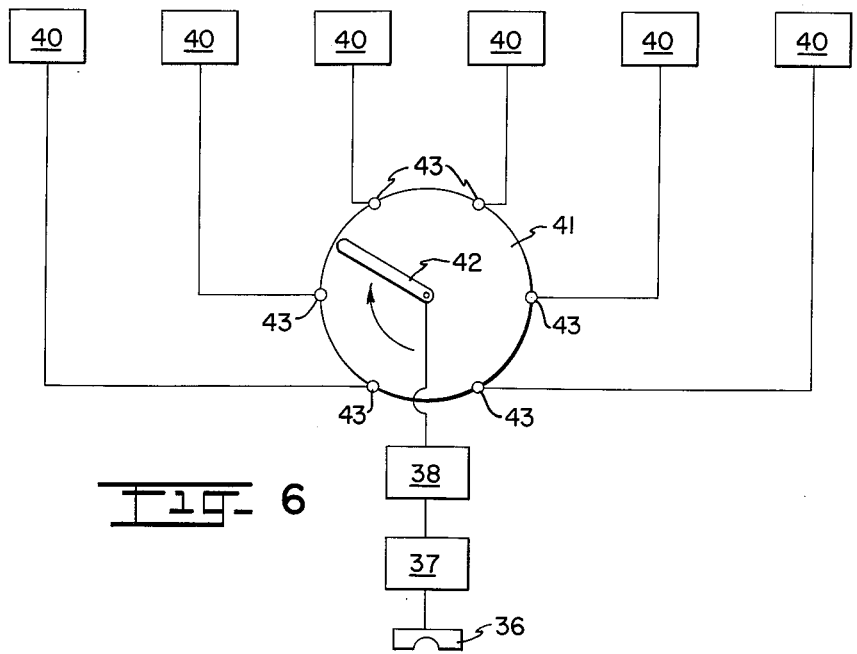
INVENTOR.
DONALD H. MENZEL
THOMAS GOLD
BY
Philip H. Sheridan
ATTORNEY United States Patent Office 3,034,594
Patented May 15, 1962

3,034,594
METHOD OF SEISMIC EXPLORATION AND
APPARATUS THEREFOR
Donald H. Menzel, 32 Hubbard Park, Cambridge, Mass.,
and Thomas Gold, Trapelo Road, R.F.D., South Lincoln, Mass.
Filed Apr. 8, 1958, Ser. No. 727,149
9 Claims. (Cl. 181—.5)

This invention relates to a method of seismic exploration and apparatus for use therewith. More particularly, the invention is directed to a method of geophysical exploration by means of transducer generated, narrow band, low frequency acoustic waves being set up in the earth's subsurface, detecting these ground propagated waves at different distances from the point of generation, and comparing the detected waves with the original waves as to phase, travel time and patterns.

One method of geophysical prospecting used heretofore makes use of an explosive, e.g., dynamite or the like, which on exploding causes a sharp pulse of random frequency waves to be created in the earth immediately surrounding the point of impact. Geophones or other vibration detectors are positioned to pick up the impulse at different distances from the explosion. The travel times and patterns of the impulses received at the various geophone stations provide information which can be interpreted by a skilled geologist and give the character of the subsurface layers the waves have traversed.

The foregoing method has certain practical limits of sensitivity. Furthermore, the explosion produces a wide spectrum of vibrational frequencies and the impulses received and measured by the geophones are essentially aperiodic. Since the impulses persist for only a short interval of time, one cannot satisfactorily apply the techniques of circuits sharply tuned to a narrow band of frequencies, or of integrating the periodic vibrations over a long interval of time, to achieve high sensitivity of detection. The method of geophysical exploration herein described circumvents these limitations.

It is an important object of this invention to provide an improved method of geophysical prospecting which is characterized by high sensitivity of detection.

It is a further important object of this invention to provide an improved method of geophysical prospecting utilizing techniques of circuits sharply tuned to a narrow band of frequencies and integration of pulses received over a long interval of time to provide high sensitivity of detection.

It is a further important object of this invention to provide improved means for producing periodic generation of low frequency acoustic waves within the substructure of the earth and to put as much energy as possible into acoustic waves propagated into the earth.

It is a further important object of this invention to provide an improved system of periodic pulse generation and detection for geophysical exploration which is efficient, accurate and which has high sensitivity without making as exacting requirements on the component parts as systems used heretofore.

It is an object of this invention, therefore, to provide an improved geophysical prospecting system which avoids one or more of the disadvantages of the prior art arrangements and which has an improved sensitivity.

In accordance with the invention, the geophysical prospecting system comprises generator means for generating low frequency acoustic waves in the substructure of the earth, means for transmitting a signal at the same frequency and in phase with the generated frequency to at least one point remote of the generator means, means for detecting acoustic waves generated in the earth's substructure and means for comparing the waves generated in the earth and the transmitted waves.

For a better understanding of the present invention, together with other and further objects thereof, reference is had to the following description taken in connection with the accompanying drawings wherein several embodiments are illustrated and wherein:

FIGURE 5 illustrates diagrammatically one form of the receiving and integration system; and FIGURE 6 illustrates still another form of receiving and integrating system.

Figure 1:
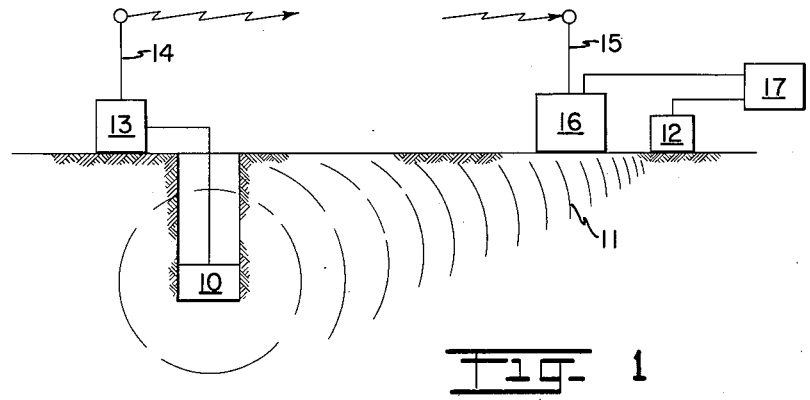
FIGURE 1 is a schematic representation of the overall system showing a receiving station remote of a generator.

It is a prime requisite of this invention to provide generator means which will direct as much energy as possible into the acoustic waves generated in the earth at some frequency which is not likely to be in excess of 500 cycles per second. Referring to FIGURE 1, there is shown the system schematically as comprising a low frequency generator 10 which in its simplest form, FIGURE 3, may consist of a hydraulic ram, driven by a powerful motor. The generator will usually be located at some distance below the surface level. Experience has shown that the most effective frequencies fall into the general range of from approximately one to several hundred cycles per second. The operator of the generator can control the frequency of the waves produced and can if desired cause the frequency to vary at any chosen rate. The generator is coupled to the earth to produce acoustic waves therein which are propagated through the substructure of the earth in all directions. These earth propagated waves 11 are picked up by a vibrator detection device 12, such as a geophone, located at some distance from the generator. At the same time the generated frequency is transmitted in phase with the acoustical waves developed to the pick-up point via a land line or a radio link. With a radio link, as shown, a carrier frequency is modulated at the frequency of acoustic wave generations and in phase therewith. Transmitter 13 radiates these signals from its antenna 14 and these signals are picked up by receiver antenna 15 and detected in receiver 16 to provide the original generated frequency. Thus, the radio waves emitted from transmitter 13 and its antenna 14 can be received at all points or stations receiving the generated acoustic waves through the ground.

The outputs from geophone 12 and receiver 16 are fed to the input of a phase sensitive integrator 17 which may conveniently use arbitrarily long integration times for the purpose of improving the sensitivity and yet not requiring a correspondingly high frequency stability. To make this clear, consider the action of an integrating device responding to a signal at a constant frequency. The recorded signal trace may be chopped into lengths of one period of the oscillator signal and successive such traces added together. The incoherent random fluctuations will then give a resultant that increases as the square root of the number of traces added together, while the oscillatory signal, if it has remained exactly in phase with the chopped length of the trace, will add up directly in proportion to the number. Various methods of making an apparatus to effect such an integration can be made, but they would all be limited to operate for such times as the phase accuracy can be maintained. It is an important part of this invention that phase accuracy can be maintained indefinitely by the separate transmission of the exact frequency. Integration times can then be made as long as one is prepared to wait and the sensitivity of the apparatus can be made correspondingly great.

Figure 2:
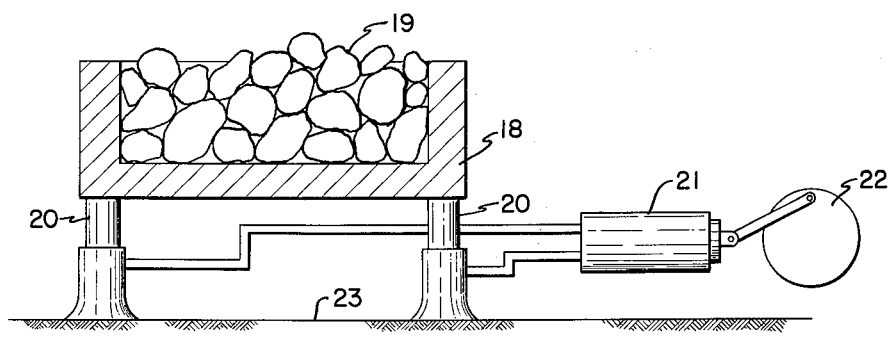
FIGURE 2 is a front view, partially in section, of one type of generator useful in the present invention.
Figure 4:
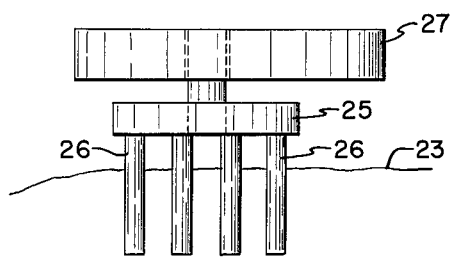
FIGURE 4 illustrates still another form of a generator of the invention.
Figure 3:
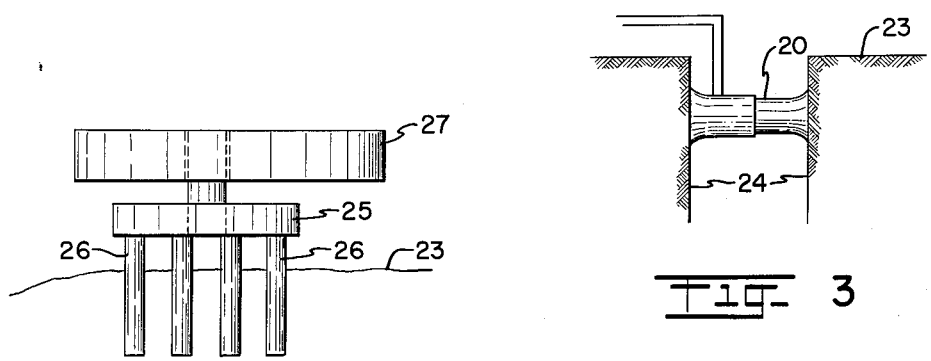
FIGURE 3 illustrates another form of the generator.

The purpose of generator 10 is to convert as much energy as possible into acoustic waves propagated into the ground. FIGURES 2, 3 and 4 illustrate forms which such a generator may take. At low frequencies which are required for the transmission of waves in rocks, a matched generator or transducer is usually difficult to achieve. The device to be described here may be usable only in the range up to a few hundred cycles, but this range is likely to be of the greatest interest for seismic prospecting. The generation of a compressional wave into the ground at a very low frequency requires a very massive transducer, for the maximum force that can be exerted in the cycle is determined by the available mass times the maximum acceleration that can be produced. Very large accelerations would imply a very large movement during the cycle. Also to convey a sinusoidally varying force to the ground the transducer must have a weight of at least half the maximum of that force. These considerations determine that the greatest possible mass should be assembled on the transducer, and this can be accomplished, for example, by loading the transducer of generator 10 with a ballast such as concrete or the like.

A large mass may be made to vibrate vertically by means of a hydraulic ram 20, FIGURE 2, interposed between the mass of a platform 18 including ballast 19 and ground 23, preferably rock. The hydraulic ram 20 is supplied with a cyclically-varying fluid pressure generated by a cylinder and piston 21 in the hydraulic circuit and activated by an engine 22. The transducer might thus take the form of a platform 18 holding ballast 19 supported on one or more hydraulic rams 20 actuated by an engine 22 driving the activating piston within the cylinder 21 at the required frequency. The platform may be in the form of a truck bed that may be jacked up on hydraulic rams and whose power plant is the truck engine.

If great mobility of the transmitter is not a requirement, present day hydraulic techniques would allow the use of masses of hundreds or thousands of tons. For reasons of efficiency of acoustic transmission into the ground the support is preferably on hard rock.

Transducers of a different design may be employed where the formation of the terrain or deliberate construction allows other than vertical forces to be applied to the rock. For example, a hydraulic ram 20 can be positioned in a crevice between rocks at a fault line to apply oscillatory force in the direction of prizing the two rock faces 24 apart, FIGURE 3. Very great masses of rock may be involved in such a case, and this may lend itself to the construction of a generator of very great power.

Torsional waves can be generated by anchoring the transducer to the ground in such a way as to transmit a torque around a vertical axis. Such an arrangement is shown in FIGURE 4. In rock this is achieved by drilling a number of holes in the rock, into which the transducer 25 is anchored by means of a number of pins 26 anchored in bed rock. An oscillating fly wheel 27 will communicate torsional oscillation into the rock of a torque depending on the moment of inertia and the amplitude of the oscillatory displacement of the fly wheel driven by a source of power (not shown). In this case the amplitude of oscillation that can be set up in the rock is limited by technical rather than intrinsic factors. Thus, such a device may not have to be so massive for given force requirements as one required to set up longitudinal oscillation, FIGURE 2.

A further possibility of setting up a generator (not shown) involves the use of a bore hole, possibly one of no other merit. The bore hole, provided it is water tight, can be filled with liquid whose pressure is changed at the desired frequency. In the case of a deep bore hole this may lead to the difficulty that the phase of the signal may not be constant over the entire depth because of the low velocity of the pressure wave in the liquid. As a uniform phase source would be best from several points of view, a liquid may be fed to various depths through small pipes and the phase adjusted at each pipe so as to synchronize the pressure at all end points of such pipes.

A phase summation of the signals received by pick-up 12, FIGURE 1, must be carried out. For this purpose, the phase of the oscillations of generator 10 must be available, together with an amplified output of pick-up 12. This will involve a communication link between the generator 10 and pick-up 12 which may conveniently take the form of a radio frequency transmitter 13 whose transmitted signal is modulated at the same frequency and in phase with acoustic wave generator 10. It is immaterial whether the integration of the signals of like phase are carried out near the pick-up location with the transmitter phase being available there or whether the received signal from ground propagated waves, after amplification, is relayed to the location of the transmitter. When alternating electric power is available at both sites from the same generator, this standard frequency may be used as a control. Synchronization can also be accomplished by telephone or telegraph lines, or in terms of an agreed upon program by simultaneous reception of time signals from standard radio transmitters such as that from WWV of the National Bureau of Standards. Accurate synchronized clock signals might also be used.

The amplitude of the signal developed by pick-up 12 at one instant is added to the signal amplitudes of all the following instants of time having the same phase relation to the transmitter signal. Such an addition may be carried out for several phase positions or it might be carried out continuously so as to make the sum available for all phase positions. A minimum of three positions is required to determine the amplitude and phase of a sine wave, which is expected to emerge after a sufficient time of integration. The accuracy requirement of such an adding device is great if some millions of cycles are to be summed, and this is desirable in order to obtain maximum performance.

For short periods of integration an analog addition may be carried out but for longer periods it would be difficult to provide a device able to record a signal that is a million times larger than the least that can be recorded. Thus it is more satisfactory to use a digital device that is not limited by capacity consideration. One such digital phase integrator is shown in FIGURE 5. Referring again to FIGURE 1, a radio link transmits a signal from the transmitting site, by means of a transmitter 13, at some suitable radio frequency modulated with a wave in phase with the oscillation of generator 10. This radio frequency is received and the modulation is amplified and detected by receiver 16. The detected signal is used to turn a synchronous motor 28 which drives a drum 29 having a magnetizable surface adapted to accept magnetic recording. The motor and connected magnetic drum will thus remain in accurate phase relation to the output of acoustic generator 10. The magnetic drum 29 acts as a storage device to store signal amplitudes at each phase position and provide means for summing of all signal amplitudes received at a particular phase position. For example, if it is desired to make the addition in six phase positions, six sets of marking points 30 are provided equally spaced about the periphery of the drum. In between each of these six marking points there are provided a number of equally spaced marking points. These marking points constitute a clock or timing track 31 which generate pulses in a magnetic head 32 positioned with its gap adjacent the clock track. These pulses serve to keep the digital computation in step with the drum so that only definite positions are used for recording. If thirty-five marking points are provided at each of the six positions, thirty-five discrete positions are available for recording. Another recording track 33 is provided adjacent the clock track. A recording head 34 and play-back head 35 are positioned to contact track 33. In the places on track 33 corresponding to the thirty-five marker positions in each of the six intervals there is recorded a number in binary notation as commonly employed in electronic computers. It will be understood that other systems of recording may be used without detracting from the basic invention.

In operation the acoustic signals are received by a transducer 36, amplified by amplifier 37 and the amplitude during each interval is translated into a digital representation, by digitalizer 38, equivalent to the amplitude. The numbers previously recorded in each of the intervals on magnetic drum 29 are read by the play-back head 35 and summed with the newly arrived signal in adder 39. The sum of amplitudes thus derived from given intervals represents the mean signal amplitude during that interval. The interval sum is then added to the total of all previous sums for that phase interval and re-recorded by recording head 34 in the same position as was previously occupied by the old number, the precise positioning being controlled by the clock track 31. In this example, numbers up to $2^{35}$ can be recorded, with at most $2^3$ per individual signal. Thus $2^{33}$ cycles can be added to provide the long term integration necessary for maximum performance. It will be understood that means such as an erase head (not shown) will be positioned between the recording head 34 and play-back 35 to erase previously recorded signals after they are read by the play-back head by a manner well known in the art. It will be further understood that where geophones are positioned at a plurality of locations that a recording track 33, associated heads and equipment are provided for each geophone position.

One advantage of the above arrangement is that the circuits responsible for all operations concerning the received signal are common to all six additions, and therefore no consistent difference in their performance from one channel to another is to be expected.

As an alternative, a number up to the smallest in any channel can be subtracted in all channels in order to reduce the requirements for high storage capacity.

Another integrating device may use counting units 40 for each phase position, FIGURE 6, with each unit being capable of counting up to the maximum number. These counting units are supplied with electrical pulses from transducer 36, as amplified by amplifier 37 and converted to digital representations in digitalizer 38, through a switching network 41, which may be either electronic or electro mechanical. The wiping contact 42 of switch 41 is maintained in phase with the generated acoustic waves by means of a motor 28 similar to that of FIGURE 5 and is connected to receive the output from geophone 36. The wiper arm 42 makes contact with contacts 43 in order to transfer the signals to the counter 40 corresponding to the phase of the generated waves.

Measurable simplification and gain in sensitivity is obtained by this system since the transducers 36 (geophones) need not be responsive to a wide frequency band as heretofore required. Thus the geophones may be made more sensitive to a narrow band of frequencies and improve the overall sensitivity of the system. Here again an arrangement as shown in FIGURE 6 is provided for each geophone position.

It will be appreciated that a complete measurement according to the present invention comprises a plurality of separate runs with various fundamental frequencies for the acoustic waves. Each run is conducted with a given acoustic wave frequency for a length of time sufficient to obtain a satisfactory record. The basic information of sub-surface structure is obtained from an analysis of all the records run at the various frequencies at a particular location or set of locations.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. In a method of seismic exploration comprising the steps of generating low frequency repetitive sinusoidal waves within the earth's substructure, transmitting signals at a frequency and wavelength in phase with the sinusoidal waves, rotating a recording drum at a rate in phase relation with the signals transmitted, detecting the sinusoidal waves and developing electrical signals equivalent to the amplitude of the sinusoidal waves, amplifying the generated signals and translating them into a numerical designation as a measure of the amplitude thereof, then recording the numerical designation on the drum over a selected time interval so as to be a function of the phase of the transmitted signals.

2. The method of claim 1, being further characterized by the step of integrating the transmitted signals received during a predetermined phase interval in step with the phase of the electrical signals to provide a record of the mean amplitude of electrical signals received during said phase interval.

3. Apparatus adapted for use in seismic exploration comprising: generator means for generating low frequency repetitive signals in the earth, transmitter means associated with said generator means for transmitting a signal at a like frequency and in phase with the repetitive signals, pulse-generating storage means selectively responsive to the transmission of signals by said transmitter means to generate pulses in phase relation with the signals transmitted thereto, detector means located at a distance from said generator means to receive the repetitive signals, together with adder means connected to said detector means and being responsive to the generation of pulses by said storage means for adding together the repetitive signals received over a predetermined time interval as a function of the phase of the transmitted signals.

4. Apparatus as set forth in claim 3, wherein the means for transmitting a signal of like frequency and in phase with the repetitive signals comprises a radio frequency transmitter modulated by the frequency of the repetitive signals in phase therewith, and the receiving means comprises a radio frequency receiver adapted to demodulate the carrier to derive a signal, remote of said transmitter, of like frequency as the repetitive signals and in phase therewith.

5. Apparatus as set forth in claim 3 wherein the generator means comprises driven means coupled to the earth, cyclically driven at a predetermined range of frequencies to deliver sinusoidal waves of a repetitive nature.

6. Apparatus as set forth in claim 5 wherein the driven means includes a hydraulic ram effectively coupled to the earth, adapted to apply substantial forces thereto and set up low frequency acoustic vibrations in the substructure thereof, said ram including driving means operative to actuate the ram at a cyclic rate according to the desired frequency of the signals to be generated.

7. Apparatus as set forth in claim 3 wherein the storage means comprises a drum disposed for rotation as a phase function of the repetitive signals, having a surface of magnetizable material, a plurality of magnetizable tracks on the surface having at least one magnetic head adjacent each of said tracks, one of said tracks being a clock track with a plurality of magnetized spots recorded thereon at predetermined positions about the periphery of said drum, and said adder means includes an adder circuit adapted to be actuated by pulses developed by a magnetic head adjacent the clock track, a play-back and a record head adjacent another magnetizable track with the output of said play-back head connected to said adder circuit, digitalizer means connected to said detector means to receive and convert signals developed by said detector means to binary representations and having means for pplying these binary representations to said adder circuit for summation with output signals from said playback head and feed this summation to the record head in esponse to clock pulses to be recorded on the drum in he same position as that occupied previously by the signals which produced the output in the play-back head.

8. Apparatus as set forth in claim 3 wherein the storge means comprises switching means having a plurality f contacts arranged at preselected intervals about a circle, plurality of counters each connected to a contact of the witching means, a wiper arm centered within the circle or rotation as a phase function of the generated waves o wipe each contact in sequence, and said adder means ncludes a digitalizer adapted to receive and convert the ignals developed by said detector means to binary representations thereof and means for applying these binary epresentations to said wiper arm.

9. Apparatus adapted for use in seismic exploration, :omprising: generator means for generating low frequency repetitive signals in the earth; transmitter means associated with said generator means for transmitting a signal at a like frequency and in phase with the repetitive signals; at least one detector means located at a distance from said generator means to receive the repetitive signals and to develop signals equivalent to the amplitude of signals received; and integrator means connected to said detector means and being responsive to the generation of signals by said transmitter means for integrating the repetitive signals received from said detector means over a predetermined time interval as a function of the phase of the transmitted signals.

References Cited in the file of this patent

UNITED STATES PATENTS

| | | |
|---|---|---|
| 2,281,751 | Cloud | May 5, 1942 |
| 2,353,492 | O'Connor | July 11, 1944 |
| 2,364,209 | Green | Dec. 5, 1944 |
| 2,424,108 | Merten | July 15, 1947 |
| 2,521,130 | Scherbatskoy | Sept. 5, 1950 |
| 2,688,124 | Doty et al. | Aug. 31, 1954 |
| 2,700,753 | Peterson | Jan. 25, 1955 |
| 2,745,507 | Bodine | May 15, 1956 |
| 2,779,428 | Silverman | Jan. 29, 1957 |
| 2,794,965 | Yost | June 4, 1957 |
| 2,855,147 | Greening | Oct. 7, 1958 |
| 2,910,134 | Crawford et al. | Oct. 27, 1959 |